United States Patent

Banon

[11] 4,072,292
[45] Feb. 7, 1978

[54] DIAPHRAGM VALVE
[75] Inventor: Gabriel J. C. Banon, Paris, France
[73] Assignee: Societe Industrielle d'Etudes et de Realisations Scientifiques S.I.E.R.S., Paris, France
[21] Appl. No.: 678,552
[22] Filed: Apr. 20, 1976
[30] Foreign Application Priority Data
  Apr. 29, 1975  France .................... 75 13372
[51] Int. Cl.² ................................. F16K 7/12
[52] U.S. Cl. ..................................... 251/331
[58] Field of Search ............................ 251/331
[56] References Cited
  U.S. PATENT DOCUMENTS
  597,445    1/1898   Toof .................... 251/331
  2,388,988  11/1945  Mueser ............. 251/331 X
  3,414,235  12/1968  Lumpp ................ 251/331
  FOREIGN PATENT DOCUMENTS
  1,817,659  12/1968  Germany ........... 251/331

Primary Examiner—Arnold Rosenthal
Attorney, Agent, or Firm—Oblon, Fisher, Spivak, McClelland & Maier

[57] ABSTRACT

A diaphragm valve, for controlling the flow of various fluids, particularly corrosive fluids, includes a valve body with a fluid passage defined therethrough, a flexible diaphragm clamped at its periphery between the body and a cover, and a suitably shaped movable knob, integral with a valve stem and mounted so as to be slidable within the cover, for displacing the diaphragm between a position opening and a position closing the fluid passage. The valve also contains a plurality of radially disposed, movable members arranged in a side-by-side fashion and above an annular portion of the diaphragm, one end of each member being mounted upon the cover, while the other end thereof is mounted upon the valve stem, in such a manner as to form a continuous, movable supporting surface for the diaphragm annulus.

2 Claims, 7 Drawing Figures

DIAPHRAGM VALVE

BACKGROUND OF THE INVENTION

1. Field of the Invention

The present invention relates generally to diaphragm valves, and more particularly to a diaphragm valve of the type comprising a valve body within which there is a fluid passage, a flexible diaphragm clamped by means of its periphery between the body and a cover, and a movable knob, of suitable configuration and integral with a valve stem mounted so as to be slidable within the cover, for displacing the diaphragm between a position opening and a position closing the fluid passage.

2. Description of the Prior Art

It is known that in valves of the aforenoted type, it is necessary to support the flexible diaphragm in order to increase its ability to withstand the fluid pressure. A number of arrangements have heretofore been proposed for this purpose, but they provide only partial support. There thus remain large empty spaces into which the diaphragm can flex, which necessitates additional reinforecment within the material of the diaphragm itself, obviously reducing its durability to a considerable degree.

SUMMARY OF THE INVENTION

The present invention therefore has as its principal aim the remedying of the aforenoted difficulty, and to accomplish this, it has as its object a valve of the aforementioned type characterized essentially by having, in addition, a plurality of radially disposed movable members mounted in a sideby-side fashion above an annular portion of the diaphragm, the extremities of which are mounted upon the cover on the one hand, and upon the valve stem, supporting the knob, on the other hand, in such a way as to form a continuous, movable supporting surface for the diaphragm annulus.

It is easy to see that, as a result of this arrangement, the annulus of the diaphragm is constantly in contact with the surface formed by the movable members, and therefore, the diaphragm experiences no strain and its life is consequently greatly extended.

In a particular form of realization of the present invention, the movable members are mounted so as to pivot on the cover at one end thereof, while the other ends thereof are held upon the valve stem between an upper stop, integral with the valve stem, and a lower stop freely slidable upon the stem.

Thus, under the influence of the fluid pressure, the annulus of the diaphragm always pushes the sliding lower stop against the movable members, whereby between the movable stop and the movable members, there cannot be defined any openings within which the diaphragm can intrude.

Likewise the movable parts can be designed to partially overlap each other, their shape being such as to allow no play between them in the two extreme positions corresponding to the opening and the closing of the fluid passage.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein.

DETAILED DESCRIPTION OF THE ILLUSTRATED EMBODIMENTS

Figure 1:
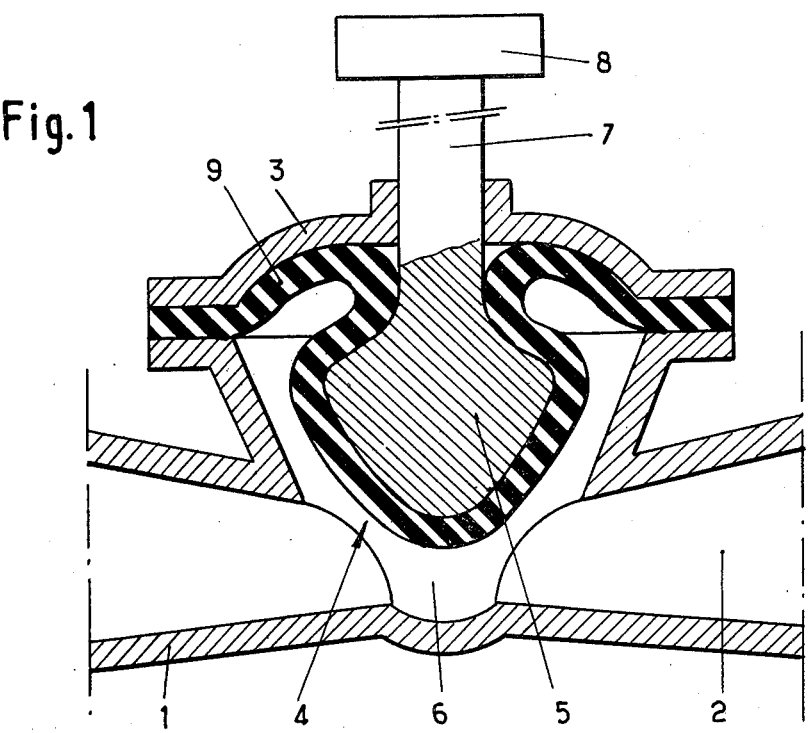
FIGS. 1 and 2 show schematically a diaphragm valve of the conventional type in its open and closed positions, respectively.
Figure 2:
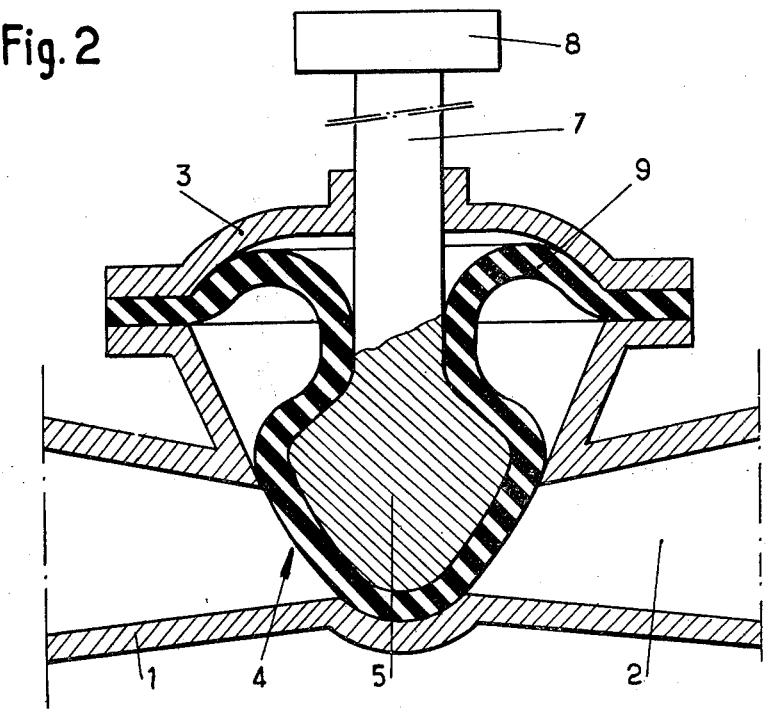

Referring now to the drawings, and more particularly to FIGS. 1 and 2 thereof, the valve shown schematically therein is an entirely conventional valve and is composed essentially of a valve body 1 having a fluid passage 2 defined therethrough and closed by means of a suitable cover 3. Between the body 1 and the cover 3 is clamped, by means of its periphery, a flexible diaphragm 4 made of an elastomer, for example, which encloses a knob 5 having a configuration which conforms to a seat 6 defined within a wall portion of the body within fluid passage 2.

The knob 5 is integral with a valve stem 7 which is mounted so as to be slidable within cover 3, and which can thus be moved axially thereof, under the action of some control means, schematically shown at 8, which may be, for example, either manual, pneumatic, or hydraulic, between a position opening and a position closing the fluid passage. These two positions are shown in FIGS. 1 and 2 respectively, and it is seen that the portion of the diaphragm enclosing the knob 5 insures the sealing of the closure in the position of FIG. 2, while its upper part or annulus 9 seals the valve from the outside and thus isolates the fluid from the control means, which is particularly useful in the fluid flow of corrosive fluids.

In the open position shown in FIG. 1, the annulus 9 of the diaphragm 4 is pressed against the interior surface of cover 3 by means of the pressure of the fluid flowing through the passage 2, and the same pressure of course prevails throughout the space bounded by means of the knob 5, the cover 3, and the upper part of the body 1, the annulus thus being perfectly supported.

It is seen, however, that when the knob 5 is moved, by the control means 8, toward the position of closure represented in FIG. 2, a substantial portion of the annulus remains pressed against the interior surface of cover 3 by means of the pressure of the fluid. The material of the annulus 9 is thus seen to be repeatedly stretched during the opening and closing operations, and such operative characteristics can rapidly cause the diaphragm to deteriorate.

There are, of course, elastomers capable of a great amount of repetitive stretching, however, they are not always compatible with the fluids to be controlled. Moreover, the work imposed upon the elastomers during the stretching of the same drastically reduces its service life which, of course, with respect to the particular function of the same, reduces the number of operations possible with such a valve.

Figure 3:
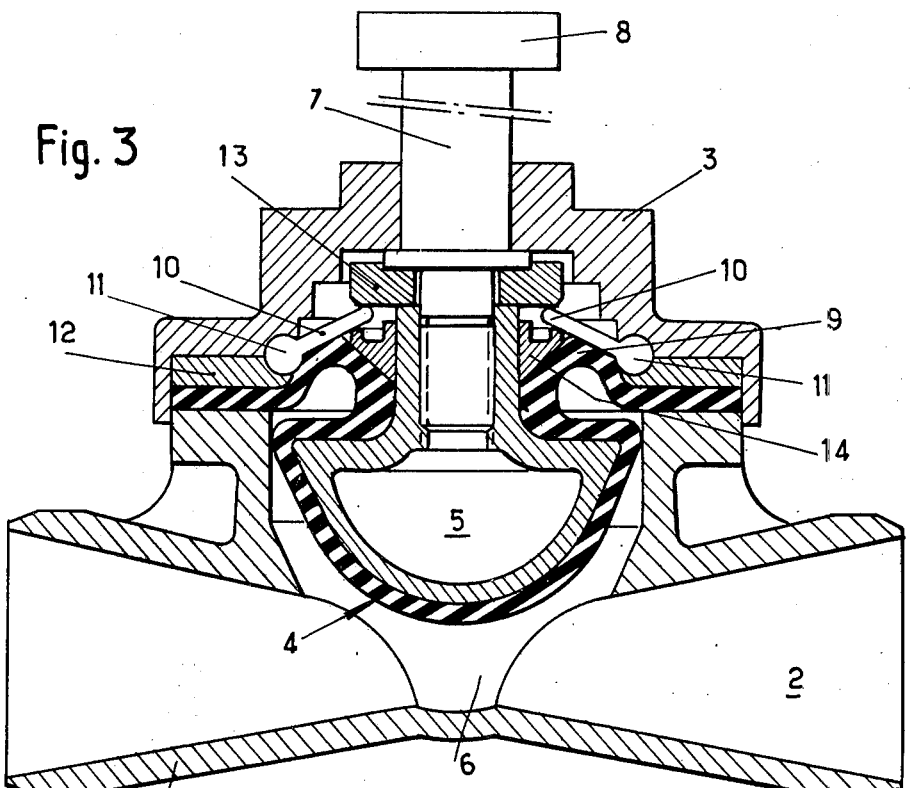
FIG. 3 is a simplified cross-sectional view of a diaphragm valve constructed in accordance with the present invention, in the open position.
Figure 4:
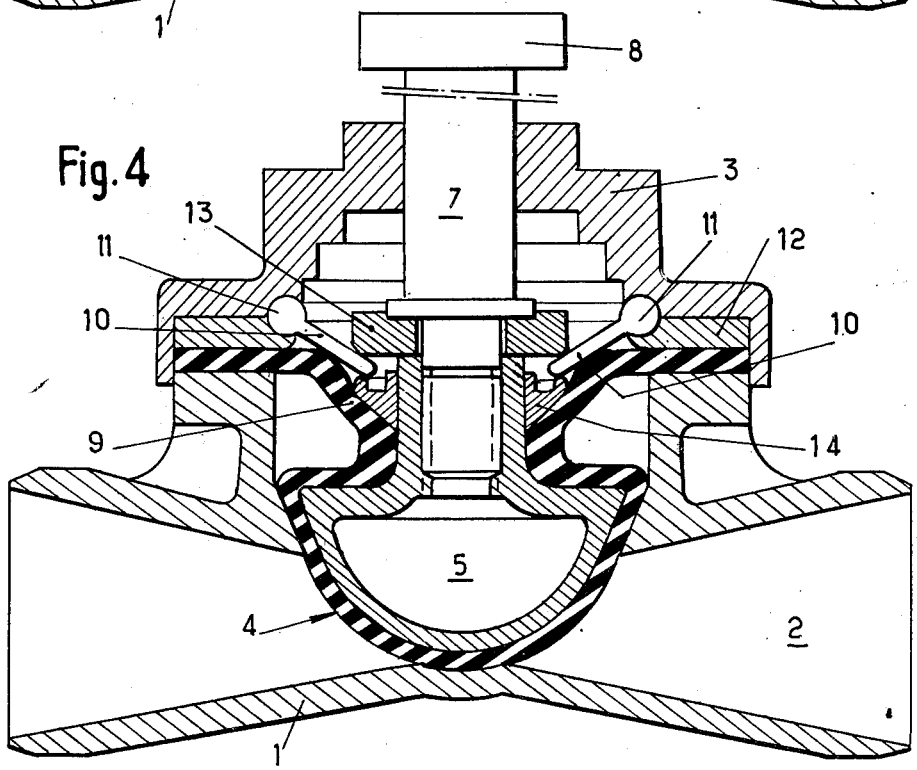
FIG. 4 is a view similar to that of FIG. 3, showing the same valve in the closed position.
Figure 5:
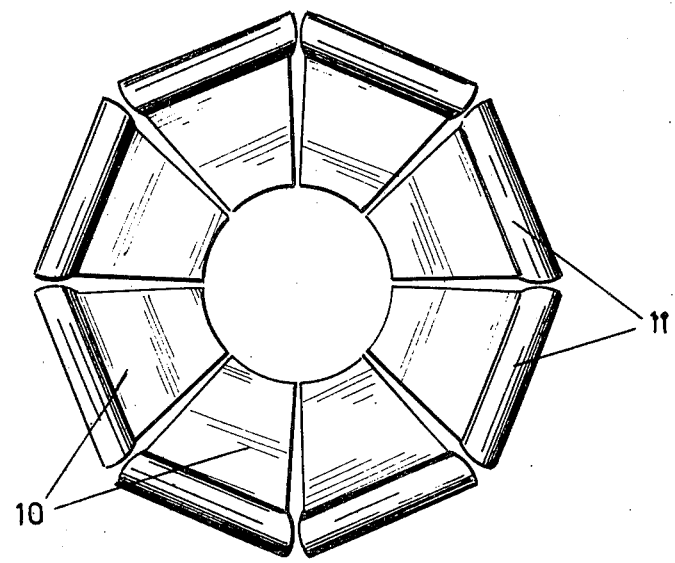
FIG. 5 is a plan view of the movable supporting surface of the present invention.

The essential aim of the present invention, then, is to realize a diaphragm valve in which the stretching of the annulus portion 9 is eliminated. In order to accomplish this, as shown in FIGS. 3 and 4, a plurality of pivotably movable parts or members 10 are disposed radially and in a side-by-side manner above the annulus of the diaphragm 4, and together, these members 10 form a deformable annular surface, as illustrated in FIG. 5.

Figure 6:
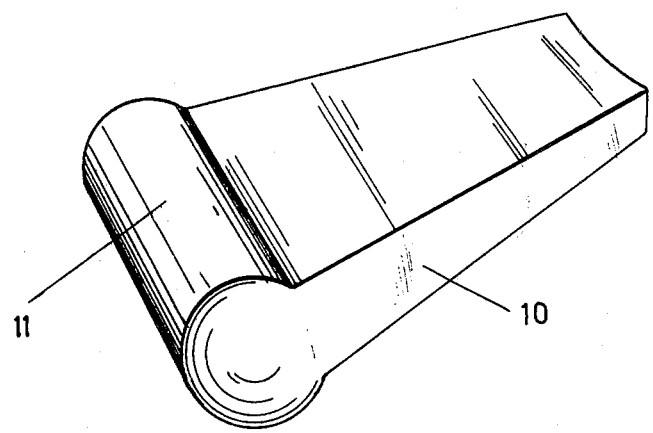
FIG. 6 is a perspective view of one of the components comprising the surface of FIG. 5.

Thus, as can be seen more clearly in FIG. 6, each of the members 10 has an enlarged, cylinder-shaped end portion 11 which is mounted so as to pivot within a socket of similar shape between the cover 3 and a fixed annular, supporting disk 12 disposed above the periphery of the diaphragm 4. It will be noted that the shape of these sockets is such that, once inserted, the members 10 cannot be removed.

With respect to the other ends of the members 10, the same are similarly held between an upper stop 13 integrally fixed with the valve stem 7 and a lower, conically-shaped stop 14 free to slide somewhat upon stem 7. Thus, the movable members 10 follow the movements of the knob 5, pivoting about the axes constituted by means of the cylindrical enlargements 11.

One can readily see that because of this arrangement, under the action of the pressure of the fluid flowing through the passage 2 of the valve body 1, the annulus 9 is always pressed against the movable surfaces formed by means of the members 10, regardless of the position of the knob 5, and as the surfaces 10 follow the motion of the knob 5, the annulus obviously cannot experience any strain. Moreover, since the sliding stop 14 is always pressed against the members 10 by means of the annulus, there can be no open space or gap between members 20 and the stop 14 into which the diaphragm 4 might be forced under the action of the fluid pressure.

It is apparent, then, that under these conditions, the life of the diaphragm 4 will be considerably extended, consequently increasing the number of valving operations possible for the valve.

Figure 7:
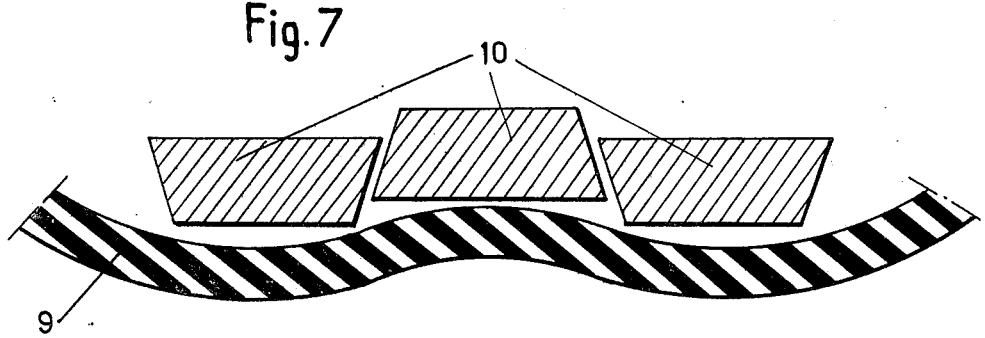
FIG. 7 is a schematic partial cross-sectional view illustrating another way of fabricating the movable support surface of the present invention.

Of course, one could just as well employ members 10 of another shape or with another system of articulation, and such could be disposed upon the cover as well as upon the valve stem. Thus, one could, for example, as illustrated in FIG. 7, utilize partially overlapping members 10 configured such that no space remains therebetween at the two extreme operating positions, corresponding to the opening and closing of the fluid passage 2 by the valve, and in this manner, the risk of stretching the diaphragm 4 is again reduced, even under high fluid pressures.

Obviously, many modifications and variations of the present invention are possible in light of the above teachings. It is to be understood therefore that within the scope of the appended claims, the present invention may be practiced otherwise than as specifically described herein.

What is claimed as new and desired to be secured by Letters Patent of the United States is:

1. A diaphragm valve of the type, comprising:
    a valve body with a fluid passage defined therethrough;
    a flexible diaphragm clamped at its periphery between said body and a cover;
    a movable knob, of suitable configuration and integral with a valve stem mounted so as to be slidable axially within said cover, for displacing said diaphragm between a position opening and a position closing the fluid passage; and
    a plurality of radially disposed movable members arranged in a side-by-side manner above an annular portion of said diaphragm concentrically disposed about said valve stem, each of said members being pivotably mounted at one of the ends thereof upon said cover while the other ends thereof are held upon said valve stem between an upper stop integral with said stem and a lower stop freely slidable upon said stem in such a way as to form, along the radial extent thereof, a substantially continuous, movable supporting surface for said diaphragm annulus and to provide rigid support for said diaphragm annulus on the cover side thereof so as to preclude stretching thereof under pressure of the fluid in said fluid passage.

2. A diaphragm valve as set forth in claim 1, wherein: said movable members partially overlap each other and are configured so that there are no gaps between said members in said two extreme positions corresponding to the opening and closing of the fluid passage.

* * * * *